March 11, 1969     O. C. SCHMID     3,432,133
SHOVEL HOLDER ATTACHMENT FOR VEHICLES
Filed April 4, 1967
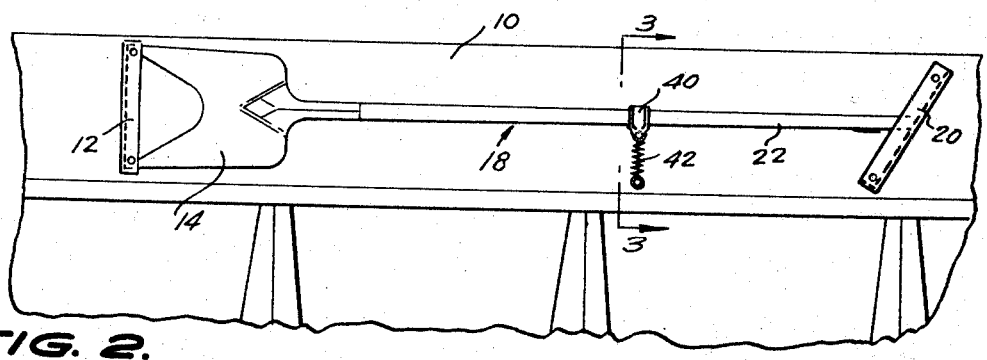
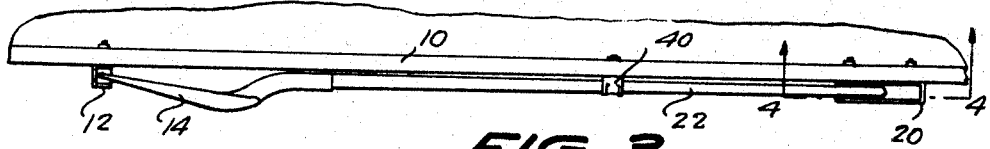
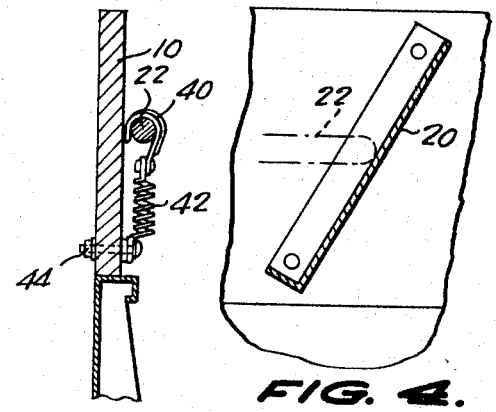
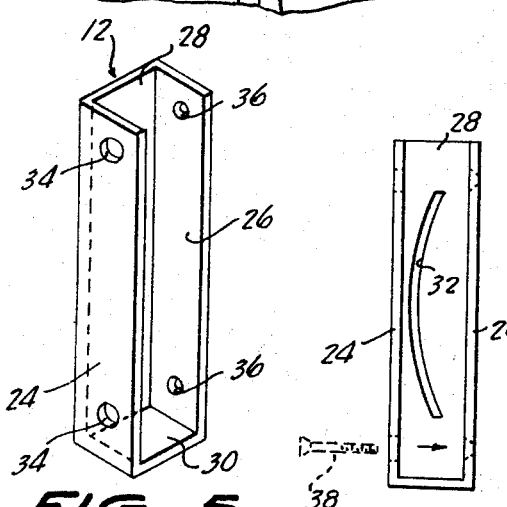
INVENTOR.
OSWALD C. SCHMID,
BY
Berman, Davidson & Berman
ATTORNEYS.

United States Patent Office 3,432,133
Patented Mar. 11, 1969

3,432,133
SHOVEL HOLDER ATTACHMENT FOR VEHICLES
Oswald Charles Schmid, R.D. 1,
Phillipsburg, N.J. 08865
Filed Apr. 4, 1967, Ser. No. 628,324
U.S. Cl. 248—201
Int. Cl. A47f 7/00; A47b 81/00
4 Claims

ABSTRACT OF THE DISCLOSURE

A holder for securely supporting a shovel, having a rounded or rectangular head, on a vehicle during transit. The holder includes a vehicle mounted bracket designed to receive either type of shovel head, and a cooperating inclined bracket for receiving the handle and wedging the shovel between the brackets.

---

This invention relates to a vehicular mounted carrier, and in particular a carrier adapted to securely hold a shovel.

Many types of truck drivers, as well as drivers of other vehicles, find it necessary to resort to use of a shovel during the course of their work. Typical examples are the personnel on road sanding trucks, or coal delivery trucks. However, the carrying of an implement of any appreciable length, such as a shovel, presents a problem, as usually there is no convenient or secure location on or in the vehicle for receiving the implement.

Accordingly, it is an object of this invention to provide a holder for a shovel adapted to be mounted in a convenient location on a vehicle.

A further object of this invention is to provide a vehicle mounted shovel holder which will securely wedge the shovel on the vehicle, thereby preventing its accidental displacement during transit.

Another object of this invention is to provide a shovel holder of the character indicated which securely grips the shovel in a rattle-free manner.

Yet another object of this invention is to provide a shovel holder adapted to be attached to a vehicle, which comprises a minimum number of component parts and an inexpensive construction.

Other objects of this invention will become apparent from the following description and drawing, wherein:

FIGURE 1 is a side view in elevation of one form of the shovel holder attachment of the present invention, illustrating the manner of mounting a shovel having a rectangular head on the side of a vehicle;

FIGURE 2 is a top plan view of the shovel holder attachment shown in FIGURE 1;

FIGURE 3 is an enlarged cross-sectional view taken substantially along the plane indicated by line 3—3 of FIGURE 1;

FIGURE 4 is an enlarged cross-sectional view taken substantially along the plane indicated by line 4—4 of FIGURE 2;

FIGURE 5 is a perspective view of the shovel head mounting bracket comprising a portion of the shovel holder attachment shown in FIGURE 1;

FIGURE 6 is a fragmentary view in side elevation similar to FIGURE 1, but illustrating a modified form of the invention for mounting a shovel having a rounded head;

FIGURE 7 is a front view in elevation of the shovel head mounting bracket shown in FIGURE 6.

Referring now to the drawings, wherein like elements are indicated by like numerals throughout the several views, one form of the shovel holder attachment of the present invention is shown in FIGURE 1, mounted on the side 10 of a vehicle, such as a truck.

The shovel holder attachment comprises a channel-shaped bracket 12 adapted to receive the rectangular head 14 of shovel 18. Cooperating with bracket 12 is a channel-shaped bracket 20 for receiving the handle 22 of shovel 18. As shown in FIGURES 1, 2, and 4, the bracket 20 is mounted on the side 10 of the vehicle at an incline towards bracket 12.

Bracket 12 is substantially U-shaped in cross-section and includes flanges 24 and 26 joined by a planar web 28. The top end of bracket 12 is open for reception of shovel head 14, while a bottom wall 30 closes the other end, limiting downward movement of the shovel head. Rectangular head 14 of shovel 18 will normally abut web 28 and seat on bottom wall 30, when placed in bracket 12.

Bracket 12 is also provided with pairs of aligned openings 34, 36. Openings 36 are countersunk to receive the head of suitable fasteners (such as fastener 38 shown in phantom in FIGURE 7), which secure the bracket to side 10 of the vehicle. Fastener 38 passes completely through opening 34, which is an alignment and access opening, and then through opening 36 into side 10, and is secured thereto.

Bracket 20 is of identical channel-shaped construction as bracket 12, except openings 34, 36 are reversed so that when it is secured to side 10 of the vehicle, bracket 20 opens towards bracket 12.

In operation, the head of shovel 18 is placed in bracket 12 through its open end and moved downwardly along web 28. As the shovel is moved downwardly, handle 22 will enter the open end of bracket 20 and move along its web, which constitutes an inclined planar surface.

Since the web of bracket 20 is inclined towards bracket 12, downward movement of the shovel will cause handle 22 to move laterally towards bracket 12, pushing head 14 towards web 28.

In the embodiment of FIGURE 1, downward movement will continue until the edge of head 14 abuts web 28. Since the distance between the webs of brackets 12 and 20 decreases as the shovel moves downwardly, further downward movement of the shovel will be precluded, and the shovel will securely wedge between the brackets in a rattle-free manner.

FIGURES 6 and 7 illustrate a slightly modified form of the invention for holding a shovel 18', having a rounded head 16. The components of this form are identical to the form of the invention illustrated in FIGURES 1–5, except that a centrally located curved slot is cut in web 28.

The curvature of slot 32 conforms to the curvature of rounded head 16 of shovel 18', and is adapted to receive the head when placed in bracket 12, as shown in FIGURE 6.

In FIGURE 6, downward movement of shovel 18' will cause head 16 to enter slot 32, as movement of the handle of shovel along the inclined surface of bracket 20 will cause head 16 to be pushed through the slot. Lateral movement of shovel 18' will continue until the lateral edges 46 of head 16 bind at the top and bottom of slot 32, and the shovel 18' will then be wedged between the brackets 12 and 20.

The angle of incline of bracket 20 can be adjusted so that the shovel wedges at about the time handle 22 reaches the midpoint of the inclined web of bracket 20, and rounded head 16 is centered in slot 32, or rectangular head 14 is seated on bottom wall 30 of bracket 12.

To insure that the shovel remains in wedged engagement, a hook 40 is provided to extend about handle 22 after the shovel is seated.

Hook 40 has a coil spring 42 secured to its lower end. Coil spring 42 is secured by a fastener 44 to the side 10 of the vehicle.

When hook 40 is placed over handle 22, coil spring 42 will be elongated and urge the hook 40 and handle 22 downwardly to maintain the wedged engagement of the shovel, and prevent its accidental displacement during transit of the vehicle.

While specific embodiments of my invention have been disclosed in the foregoing description, it will be understood that various modifications within the spirit of the invention may occur to those skilled in the art. Therefore, it is intended that no limitations be placed on the invention except as defined by the scope of the appended claims.

I claim:

1. A holder for supporting a shovel having a relatively wide head and a relatively narrow handle comprising a first rectangular bracket adapted to be secured to a supporting surface on a vehicle, said bracket being open at the top and front and including a substantially upright planar rear wall of a length substantially equal to the width of the shovel head for abutment therewith, spaced opposed sidewalls and a bottom wall closing the lower end, and a second rectangular bracket adapted to be secured to a vehicle supporting surface in spaced relation to said first bracket, said second bracket being open at the top and rear and including spaced opposed sidewalls, a bottom wall closing the lower end, a substantially front planar wall of a length at least equal to that of the rear wall of said first bracket and inclined toward said first bracket for sliding contact with the shovel handle to push the shovel head into abutment with the rear planar wall of said first bracket, thereby wedging the shovel between the planar rear and front walls of said first and second brackets.

2. A holder in accordance with claim 1 including resilient means adapted to be secured to a vehicle supporting surface between said first and second brackets for urging the shovel handle downwardly along the inclined front wall of said second bracket, thereby preventing accidental displacement of the shovel from its wedged position, said resilient means comprising a hook engageable over the handle of the shovel, and an elongatable coil spring secured to said hook.

3. A holder in accordance with claim 1 wherein said upright planar rear wall on said first bracket includes a curved slot for receiving the shovel head.

4. A holder in accordance with claim 1 wherein each of said first and second brackets is provided in one of its opposed sidewalls with a pair of spaced apertures for receiving threaded fastener members adapted to secure said one sidewall to a supporting surface of a vehicle, and the opposed sidewall is provided with a second pair of larger apertures for insertion therethrough of said fastener members and access of a tool to turn the fastener members, the apertures of said second pair being respectively aligned with the apertures of said first pair.

References Cited

UNITED STATES PATENTS

| | | | |
|---|---|---|---|
| 1,914,259 | 6/1933 | Irwin | 224—1 |
| 2,344,540 | 3/1944 | Dowd | 211—60 |
| 2,512,622 | 6/1950 | Fish | 211—64 |
| 2,649,191 | 8/1953 | McLaughlin | 211—60 X |
| 2,988,317 | 6/1961 | Butzow | 248—309 |
| 3,105,666 | 10/1963 | Orr | 224—42.45 X |

ROY D. FRAZIER, *Primary Examiner.*

J. FRANKLIN FOSS, *Assistant Examiner.*

U.S. Cl. X.R.

224—42.45; 211—60